United States Patent [19]
Revelli

[11] Patent Number: 4,801,184
[45] Date of Patent: Jan. 31, 1989

[54] INTEGRATED OPTICAL READ/WRITE HEAD AND APPARATUS INCORPORATING SAME

[75] Inventor: Joseph F. Revelli, Rochester, N.Y.

[73] Assignee: Eastman Kodak Company, Rochester, N.Y.

[21] Appl. No.: 62,524

[22] Filed: Jun. 15, 1987

[51] Int. Cl.⁴ ............................................. G02B 6/10
[52] U.S. Cl. ............................. 350/96.14; 350/96.13; 350/96.19
[58] Field of Search ............... 350/96.11, 96.12, 96.13, 350/96.14, 96.19; 372/24, 102

[56] References Cited

U.S. PATENT DOCUMENTS

| | | | |
|---|---|---|---|
| 3,871,747 | 3/1975 | Andrews | 350/96.14 |
| 3,898,585 | 8/1975 | Heidrich et al. | 350/96.14 |
| 3,951,513 | 4/1976 | Masi | 350/96.14 |
| 4,006,963 | 2/1977 | Bauer et al. | 350/96.14 |
| 4,095,869 | 6/1978 | Reichelt et al. | 350/96.14 |
| 4,421,387 | 12/1983 | Sprague | 350/96.14 |
| 4,422,732 | 12/1983 | Ditzik | 350/96.14 |
| 4,523,803 | 6/1985 | Arao et al. | 350/96.14 |
| 4,548,464 | 10/1985 | Auracher et al. | 350/96.14 |
| 4,607,909 | 8/1986 | Sanford | 350/96.14 |
| 4,707,059 | 11/1987 | Ogura et al. | 350/96.14 |

Primary Examiner—William L. Sikes
Assistant Examiner—Robert E. Wise
Attorney, Agent, or Firm—Warren W. Kurz

[57] ABSTRACT

Apparatus for writing and/or reading information on a recording element comprises an integrated optical write/read head of the type comprising a planar optical waveguide and means for deflecting a guided beam of radiation out of the waveguide at an egress zone and for bringing such beam to a focused spot on a desired data track on the recording element. Means, responsive to any displacement of such focused spot from a desired data track, is provided for selectively varying the effective refractive index of the waveguide in the vicinity of the egress zone in order to vary the tracking position of the spot. Such means comprises a pair of spaced parallel electrodes in close proximity to the egress zone, and means for producing an electric field between such electrodes, such field varying with the tracking error.

10 Claims, 3 Drawing Sheets

INTEGRATED OPTICAL READ/WRITE HEAD AND APPARATUS INCORPORATING SAME

BACKGROUND OF THE INVENTION

This invention relates to the field of optical recording and, more particularly, to improvements in optical heads for writing and/or reading information on a radiation-sensitive recording element, such as an optical disk. More specifically, this invention relates to improvements in optical read/write heads of the type which employ integrated optics.

In recent years, considerable effort has been expended in miniaturizing the electro-optical systems used to write and/or read information on optical recording elements. Such systems, often referred to as optical "heads" or "pick-ups," typically comprise at least one diode laser, various bulk optical elements (e.g. prisms, lenses, mirrors, etc.) for expanding, shaping, deflecting and focusing the beam emitted by such laser, and a plurality of individual detectors which serve to detect from the laser energy reflected (or transmitted) by a recording element the recorded information. Such detectors also serve to develop focus and tracking errors signals for controlling the focus and tracking position of the laser beam on the recording element. With the advent of the diode laser, such electro-optic read/write systems have been reduced in size to a volume of less than about 15 cubic centimeters (i.e. one cubic inch). Equally important is the fact that the mass of such electro-optic systems has been reduced to less than about 100 grams.

Notwithstanding significant strides in miniaturizing optical heads in optical recording systems, the size and weight of such elements can still have a limiting effect on the time required to access information on the recording element. Even miniaturized optical heads of the above type are sufficiently massive as to require significant time to settle into a read/write position after a "track jump" in which the head is rapidly moved relative to the recording element to access information at a different location.

In more recent years, the attention of some researchers has been focused on the field of integrated optics in an effort to further miniaturize optical read/write heads. European Patent Application No. 174,008, for example, discloses a variety of integrated optical heads, each comprising an optical waveguide into which diode laser energy is coupled. Optically integrated in the waveguide is a lens (e.g. a Fresnel lens, Bragg grating lens or Luneburg lens) for collimating the light incident thereon from the laser source, and a focusing grating coupler (FGC) for deflecting incident collimated light out of the waveguide and for bringing such light to a focused spot on the surface of the recording element. Such integrated optical heads also include a detector package for sensing light reflected obliquely from the recording element so as to detect the recorded information and the focus and tracking accuracy of the incident light. The respective outputs of such detectors are used to develop focus and tracking error signals which, in turn, are used to maintain the spot in precise focus on the recording element and to control the position of the spot relative to a desired track of information.

In one embodiment of the above-noted application, the waveguide is made of a material (e.g. $LiNbO_3$ or PLZT) which exhibits the well known electrooptic effect, and the focus and tracking error signals are used to selectively vary the refractive index of a portion of the waveguide which defines a control lens used to control the focus and tracking position of the read/write spot. Such variation is achieved by a complex array of closely spaced electrodes arranged on the top surface of the waveguide. When coupled to a voltage source, these electrodes produce fringing fields which alter the refractive index and shape of the integrated lens, thereby changing its focal length and causing the focused spot to move in a direction perpendicular to the optical axis.

While integrated optical read/write heads such as disclosed in the above-referenced European application are considerably less massive and more compact vis-a-vis optical heads employing discrete bulk optical elements, such integrated heads, and in particular those that incorporate several sets of electrodes on the waveguide for varying the tracking position of the focused spot, are relatively complicated in construction and in the manner in which they are addressed. Moreover, because some of the electrode pairs are spaced relatively far apart (of the order of millimeters) on the surface of the waveguide, relatively large voltages (e.g. thousands of volts) need be applied between the electrodes in order to produce the fringing fields required to sufficiently alter the refractive index of the waveguide to achieve the desired effect.

SUMMARY OF THE INVENTION

In view of the foregoing discussion, it is an object of this invention to provide an improved integrated optical head of the type described, a head which is improved at least from the standpoints that it is substantially simpler in construction, and requires substantially less voltage in order to electro-optically control the position of a focused laser beam on an optical recording element.

According to the invention, there is provided an integrated optical read and/or write head which, like similar heads proposed heretofore, comprises (a) an optical waveguide, (b) means for coupling laser energy into such waveguide, (c) means for coupling laser energy out of such waveguide at a light egress zone and for focusing such energy to a spot on a moving recording element, (d) detector means for producing a tracking error signal indicative of the accuracy with which such focused laser energy follows a desired information track on the recording element, and (e) means responsive to such signal, for selectively varying the effective refractive index of the waveguide in order to produce tracking movement of the focused spot. In contrast with such earlier heads, however, the optical head of the invention is characterized in that such index-varying means comprises a pair of plane parallel electrodes located proximate and parallel to such egress zone, and means for producing an electric field between such electrodes, such field being proportional to the tracking error signal and serving to uniformly change the effective refractive index of the waveguide opposite said zone. According to one preferred embodiment, the electrodes are positioned on opposite sides of the waveguide, and the applied voltage serves to selectively change the refractive index of the waveguide itself. According to another preferred embodiment, the electrodes are positioned on opposite sides of an electro-optic (e.g. liquid crystal) layer disposed adjacent the waveguide, and the effective refractive index of the waveguide is varied by selectively changing the refractive index of the adjacent layer.

The invention will be better understood from the ensuing detailed description of preferred embodiments, reference being made to the accompanying drawings.

DETAILED DESCRIPTION OF PREFERRED EMBODIMENTS

Figure 1:
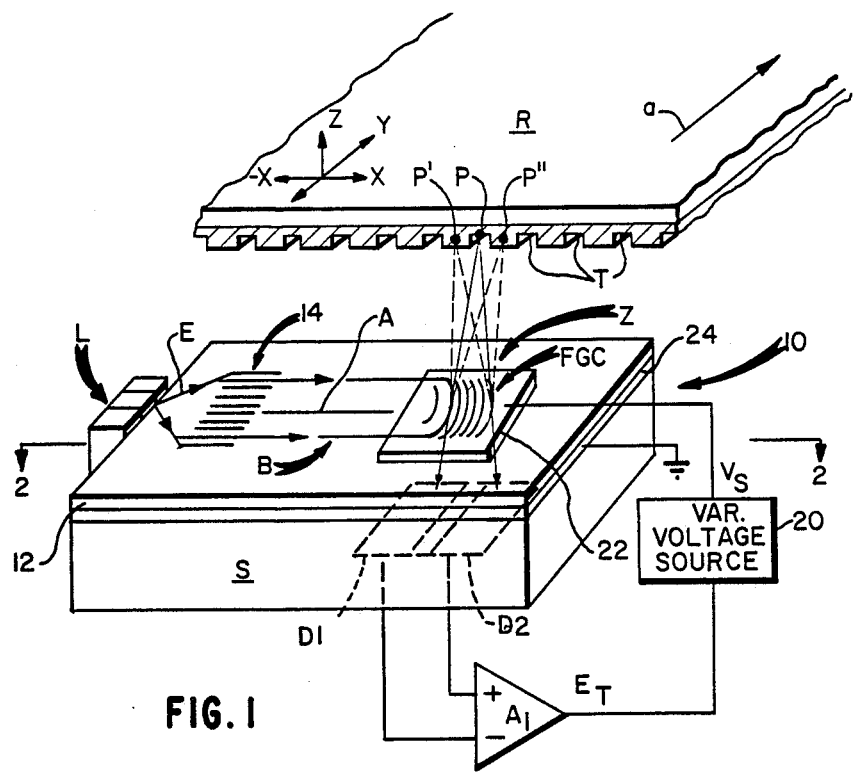
FIG. 1 is a schematic perspective view of an integrated optical read/write head embodying the invention.
Figure 2:
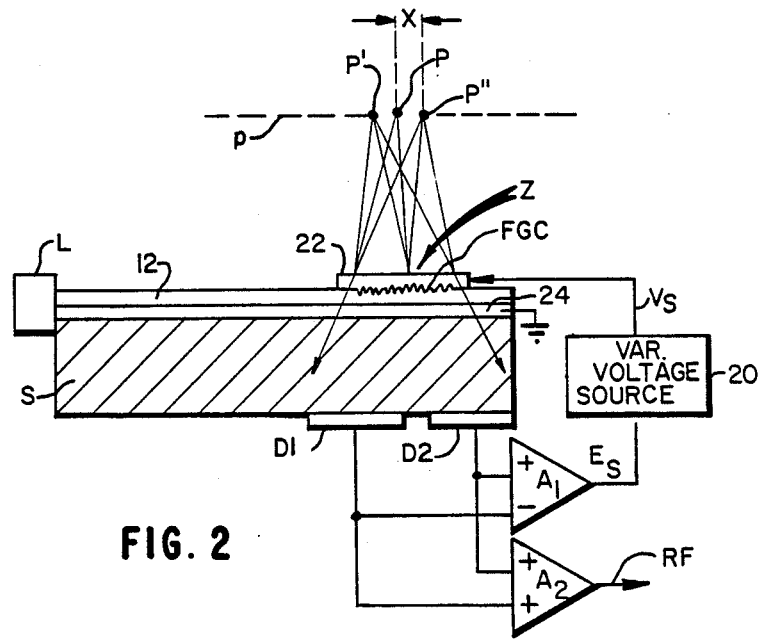
FIG. 2 is a schematic cross-sectional view of the FIG. 1 device taken along the section line 2—2.

Referring now to the drawings, FIGS. 1 and 2 schematically illustrate an integrated optical write/read head 10 structured in accordance with a preferred embodiment. Head 10 is shown in an operative position with respect to a moving optical recording element R (e.g. a conventional optical disk) which is provided with a plurality of spaced, parallel data tracks T along which data is to be written or read. During the process of writing and/or reading information on the recording element, the head is maintained relatively stationary, and the recording element is moved in the direction of the arrow a, whereby a focused spot P of radiation produced by the head is scanned along a desired data track.

Integrated optical head 10 may comprise a rigid, transparent substrate S, such as glass, which supports a planar optical waveguide 12. Alternatively, the substrate may be a silicon wafer having a thermally grown, transparent buffer layer of $SiO_2$. It will be appreciated that the drawing is not to scale since the substrate thickness is typically of the order of a millimeter, whereas the waveguide thickness is usually less than one micron. Laser energy emanating from a diode laser L or the like is coupled into the waveguide in a conventional manner, such as by "butt coupling" the diode laser output to the waveguide edge, as shown. Laser energy E diverging from diode laser and propagating through the waveguide is collimated by an integrated lens 14 to form a collimated beam B having an axis A. Lens 14 may take the form of any of the lenses (Luneburg, Fresnel, Bragg, etc.) mentioned above. A conventional focusing grating coupler (FGC), also integrated in the waveguide, is positioned to intercept beam B and to couple such beam out of the waveguide at an egress zone Z to form the focused spot P on the recording element. The design parameters for such grating couplers are described in Journal of Lightwave Technology, Vol. LT-4, No. 7, July 1986, pp. 913-917. Upon striking the recording element, the focused beam is reflected back toward the waveguide, and a part of the reflected energy passes through the waveguide and its supporting substrate, (or through the $SiO_2$ buffer layer in the case of an $SiO_2$ overcoated silicon substrate) and is incident on a pair of spaced detectors D1, D2, arranged on the bottom surface of the substrate, (or the top of the substrate, in the case of a silicon substrate). The respective outputs of the detectors D1 and D2 are subtracted by a differential amplifier, A1, to provide a tracking error signal $E_T$ which is used to control the tracking position of the focused spot P, in the manner described below. Also, the respective outputs of detectors D1 and D2 can be summed, via summing amplifier A2, to provide a signal RF representing the recorded data.

In order to continuously maintain the focused spot P in alignment with a desired data track, means are provided, in accordance with this invention, for selectively varying the "effective" refractive index, $n_{eff}$ of that portion of the waveguide in the region of the focus grating coupler (i.e. zone Z) by an amount proportional to the tracking error signal $E_T$. As noted in U.S. Pat. No. 4,047,795, which discloses an integrated optic device for scanning a collimated laser beam, a uniform change in the refractive index of the waveguide as a whole in the region of the egress zone will cause a change in the angle ($\theta$) at which the collimated light beam is coupled out of the waveguide. According to the present invention, this principle is used to precisely maintain the position of the focused spot P on a desired data track. Variations in the effective refractive index of the waveguide can be achieved by varying the refractive index of the waveguide itself, or, alternatively, by varying the refractive index of an adjacent or closely proximate layer, such as substrate S or a transparent covering layer, described with reference to FIG. 5 below.

In the embodiment as shown in FIGS. 1 and 2, means are provided for selectively varying the refractive index of the waveguide itself. In this case, the waveguide comprises an electro-optic material (e.g. lanthanium-doped lead zirconate titanate (PLZT) or lithium niobate ($LiNbO_3$)) whose refractive index is variable, depending upon the strength of an applied electric field. Such refractive index varying-means comprises a pair of transparent, plane, parallel electrodes 22, 24 positioned on opposite sides of the waveguide, in the vicinity of the focused grating coupler, and a variable voltage source 20 for producing a variable electric field across that portion of the waveguide between the electrodes, the strength of such field being determined by the tracking error signal $E_T$. Electrodes 22 and 24 may comprise, for example, transparent thin films of indium tin oxide, about 0.1 microns or less in thickness. Such films may be sputter or vapor deposited in a conventional manner. To facilitate the manufacturing process, electrode 24 may cover the entire substrate surface. Preferably, however, the electrode 24 should be restricted to the area beneath the FGC to minimize optical losses. Electrode 22 need only cover the focused grating coupler. Electrode 24 may be grounded and electrode 22 connected to the output $V_s$ of the variable voltage source 20, as shown. The output of the variable voltage source 20 is determined by its input, $E_T$ which, as mentioned above, is determined by the amount by which the focused spot P is displaced from a desired track. As $V_s$ varies about a nominal level, the focused spot P can be positioned anywhere within the angular range $\theta$, from P' to P".

Figure 3:
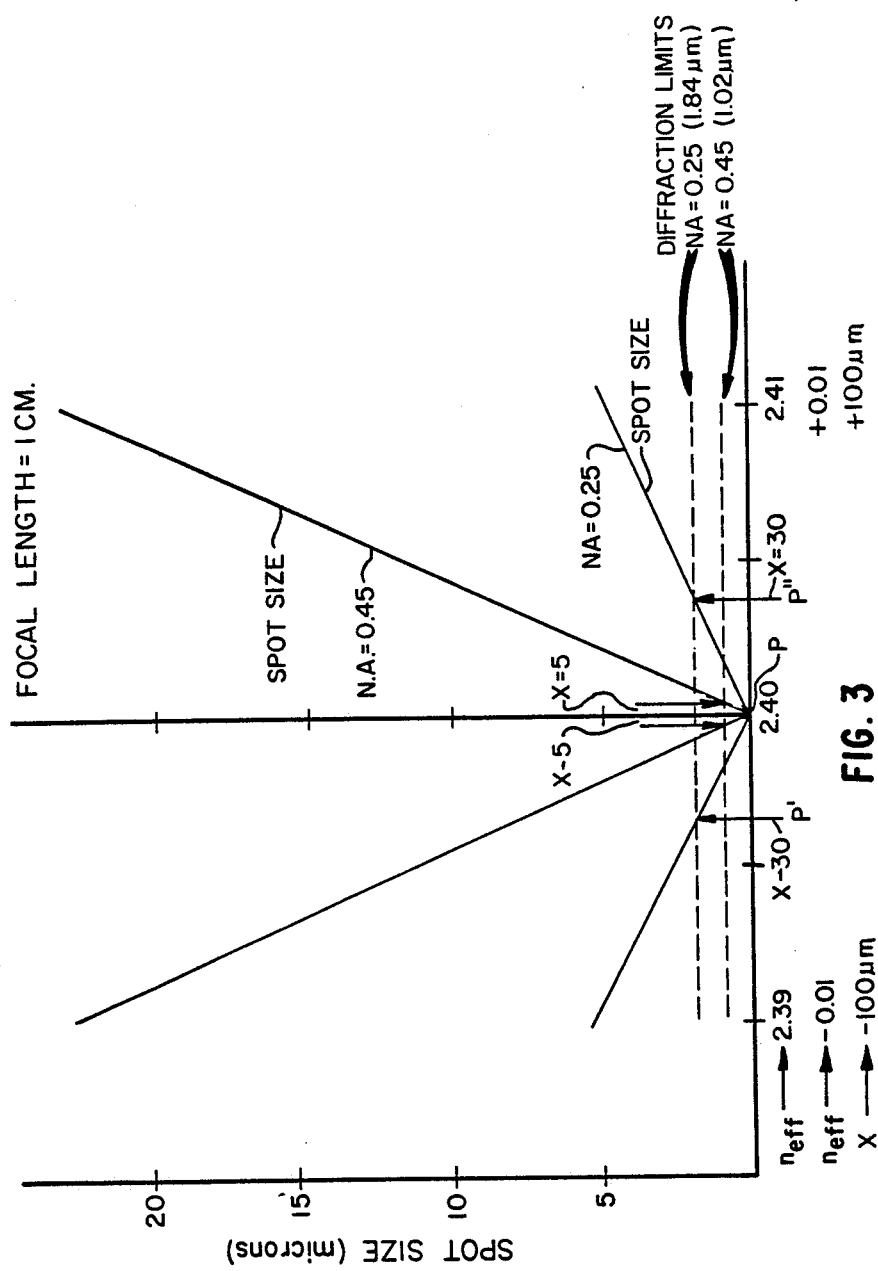
FIG. 3 is a graph relating the parameters of focus spot size, refractive index change, diffraction limits and focused spot displacement.

For sufficiently small changes in $n_{eff}$ about some nominal value, it has been observed that (1) a linear relationship exists between spot displacement (x) and $n_{eff}$; (2) the motion of the focus spot remains in a plane p (FIG. 2) parallel to the waveguide plane; and (3) the spot size remains diffraction limited over a displacement range (2x) determined by the effective numerical aperture (NA) of the focusing lens, in this case the FGC. The relationships between spot size, calculated from geometric ray tracing, and refractive index change for two different one centimeter focal length lenses, one having a NA of 0.25 and the other of 0.45, are shown in FIG. 3. Here, the waveguide material is PLZT having a nominal effective index of 2.40. Also shown the FIG. 3 graph are the corresponding calculated diffraction-limited spot sizes (horizontal dashed lines) for the two values of NA for a wavelength of 830 nm. It will be noted that the spot sizes vary linearly with spot displacement x, and that the slopes of spot size-vs-x curves are proportional to the lens NA. From the graph, it is seen that the spot remains diffraction limited for ±5 microns for an NA of 0.45 and ±30 microns for an NA of 0.25. A deflection range of ±5 microns is sufficient to eliminate detracking mechanisms such as spindle-axis run-out and track out-of-roundness in conventional optical disk recording systems. These values of x correspond to changes $\delta n_{eff}$ of 0.0005 and 0.003, respectively. To achieve such changes in refractive index of PLZT, which has a quadratic electro-optic coefficient of $3 \times 10^{-12}$ cm$^2$/V$^2$, it is necessary to subject the waveguide to an electric field of between 0 and 0.65 volts/micron for the NA=0.45 lens, (i.e. $\Delta x = \pm 30$ μm) between 0 and 1.59 volts/micron for the NA=0.25 lens (i.e. $\Delta x = \pm 30$ μm). Because of the quadratic nature of the electro-optic effect in PLZT, it is necessary to operate about a non-zero bias field in order to insure symmetric deflections about x=o. Using a waveguide having a thickness of about 0.5 microns results in applied voltages of less than 1 volt to achieve the required refractive index change. In this case it is assumed that the guided light is TM polarized.

Figure 4:
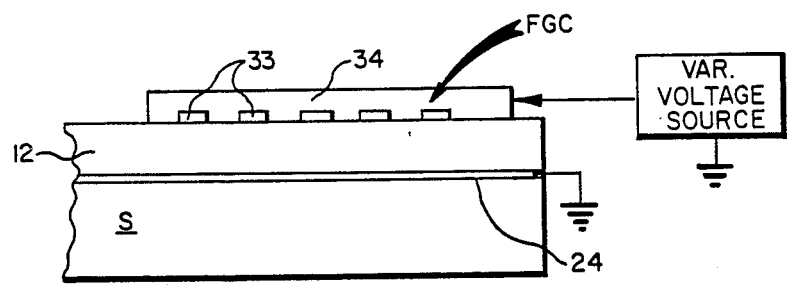
FIGS. 4 and 5 are schematic side elevations showing alternative integrated read/write heads embodying the invention.

In FIG. 4, an alternative embodiment is shown in which the focused grating coupler is formed by a patterned metal 33 formed atop the waveguide. Uniform electrical contact is assured by overcoating the metal with a transparent conductive film 34 (e.g. ITO). Such patterned metal grating can be produced by conventional photo-etching techniques.

As noted above, an alternative technique for varying the effective refractive index of the waveguide and, hence, the angle at which the light is coupled out of the waveguide, is to vary the refractive index of an adjacent or closely proximate layer. The theory of this approach is discussed in Journal of Lightwave Technology, Vol. LT-4, No. 3, March 1986, pp. 360–363. This indirect appraoch of changing the waveguide's effective refractive index offers several advantages over the previously described embodiment. For example, there is no need for the waveguide to comprise an electro-optic material; any passive optical waveguide material can be used as the waveguiding film 12. Further, the waveguide may be disposed directly on the substrate S, and there is no need for forming a planar transparent electrode between the substrate and waveguide. Also, in using an electro-optic material such as a liquid crystal material as the adjacent layer, full deflection of the focus spot can be obtained with much lower applied voltages (e.g. millivolts vs. volts), and both TE and TM modes can be readily deflected.

Figure 5:
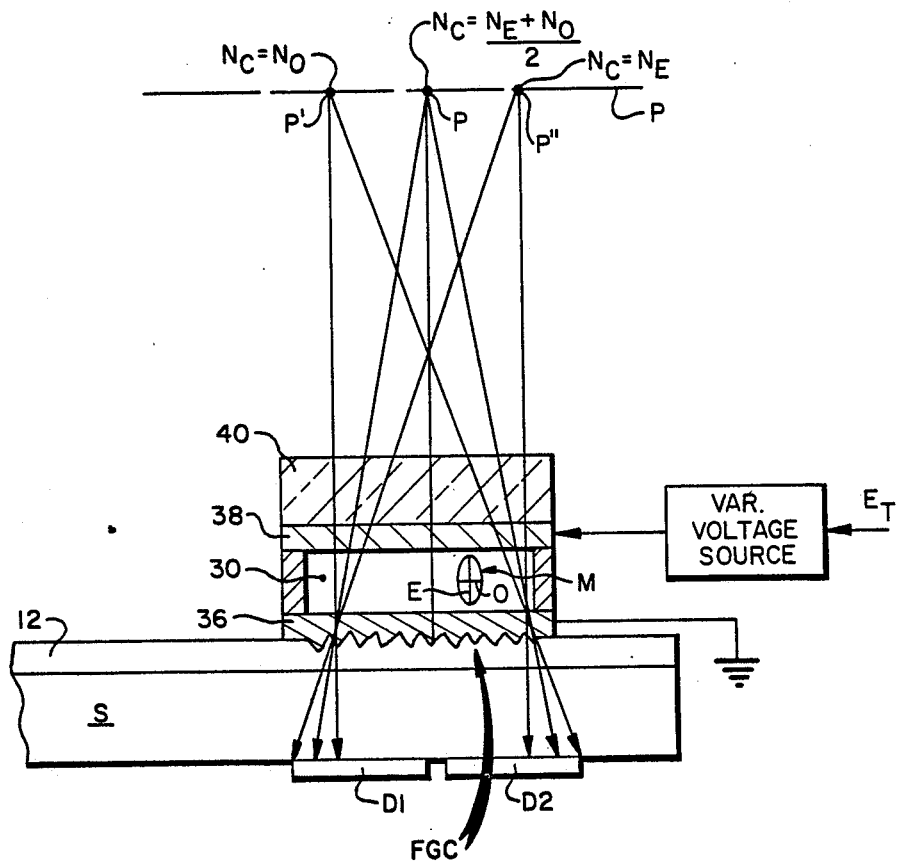

In the FIG. 5 embodiment, substrate S supports a waveguide 12 and its integrated focus grating lens (FGC) as in FIG. 1. A liquid crystal layer 30 is placed between two thin transparent electrode layers 36 and 38, for example, thin films of indium tin oxide (ITO). The lower ITO layer 36 is positioned atop the focus grating lens, and the upper electrode 34 is supported by a glass plate 40. The liquid crystal 30 may take the form of Merck's Type TCH1132 liquid crystal having an ordinary refractive index $n_o$ of about 1.50 and an extraordinary refractive index, $n_e$, of about 1.63. The waveguide 12 is chosen to have a refractive index of $n_f = 1.70$ and the substrate S is chosen to have a refractive index of $n_S = 1.457$. Waveguide 12 is of a thickness of about 0.3 microns. The effective index of refraction ($n_{eff}$) of the single TE mode of the waveguide will depend on the index of refraction of the medium on both sides of the waveguide. Hence, $n_{eff}$ will depend on the state of the liquid crystal overlayer cell. If a voltage is applied between electrodes 36 and 38, the ordinary axis O of the elongated liquid crystal molecules M will be oriented parallel to the waveguide plane and the TE$_o$ effective index of the waveguide will have a value $n_{eff} = 1.579$, a value intermediate $n_o$ and $n_e$. On the other hand, if no voltage is applied between electrodes 36 and 38, the extraordinary axis E of a liquid crystal molecule will lie in the plane of the waveguide, perpendicular to the direction of light propagation, i.e., parallel to the direction established by a surfactant applied to the upper and lower electrode surfaces. In this case, the TE$_o$ effective index of the waveguide will be $n_{eff} = 1.68$. An applied voltage intermediate these two extremes will result in an $n_{eff}$ between the two values. For example, an applied voltage of 4 volts between electrodes 32 and 34 in the arrangement of FIG. 4 is sufficient to rotate the liquid crystal molecules from one orientation to the other. This change in refractive index of the liquid crystal layer will produce a total spot deflection of 500 microns for a lens having a focal length of 1 cm. Thus, it will be appreciated that for displacements of the type needed in optical recording systems to maintain track between the focus spot and the moving data track (i.e. about ±5 microns), variations of the intermediate bias voltage of much less than one volt would be required between electrodes 32 and 34. In FIG. 5, three different focal positions, P, P' and P", are shown for the focused spot, the position depending on the instantaneous index of refraction $n_c$ of the liquid crystal. When no voltage is applied, $n_c = n_e$ and the spot focus is at P". At voltage V, $n_c = n_o$ and the spot focus is at P'. At voltage V/2, $n_c = (n_e + n_o)/2$ and the spot focus is at P.

From the foregoing, it will be appreciated that the integrated read/write optical head of the invention is advantageous in that it is capable of maintaining track through the application of relatively low voltages, voltages applied across the thickness of the waveguide (or a proximate layer), and is of a much simpler construction vis-a-vis the aforementioned prior art devices.

The invention has been described in detail with particular reference to preferred embodiments thereof, but it will be understood that variations and modifications can be effected within the spirit and scope of the invention.

I claim:

1. Apparatus for writing and/or reading information on a recording element having a plurality of data tracks along which such information is, or is to be, recorded, said apparatus comprising:

(a) a laser for producing a beam of radiation;
    (b) an integrated optical write/read head, said head comprising (i) a planar optical waveguide disposed on one surface of a planar substrate, said waveguide being positioned to receive and guide said beam along a predetermined path, (ii) means for deflecting a beam of radiation guided by said waveguide out of a data track on the recording element and for bringing such deflected beam to focus at a spot, such deflected beam emerging from said waveguide at an egress zone;

(c) means for detecting any displacement of said spot from a desired data track and for producing a tracking error signal proportional to said displacement;

(d) means responsive to said error signal for selectively varying the effective refractive index of said waveguide in the vicinity of said egress zone, said refractive index-varying means comprising a pair of spaced, parallel electrodes positioned in close proximity to said waveguide, and means for producing a variable electric field between said electrodes, said field varying as a function of said error signal.

2. The apparatus as defined in claim 1 wherein said substrate is transparent to said radiation and wherein said detecting means comprises a pair of spaced radiation-sensitive detectors positioned on that surface of said substrate opposite said one surface.

3. The apparatus as defined by claim 1 wherein said planar electrodes are positioned on opposite sides of said waveguide, and wherein said waveguide comprises an electro-optic material.

4. The apparatus as defined by claim 3 wherein said electro-optic material comprises PLZT.

5. The apparatus as defined by claim 3 wherein said electro-optic material comprise $LiNbO_3$.

6. The apparatus as defined by claim 1 wherein said head further comprises a layer of electro-optic material overlying said waveguide in the vicinity of said egress zone, and wherein said electrodes are positioned on opposite sides of said electro-optic layers.

7. The apparatus as defined by claim 6 wherein said electro-optic layer comprises a liquid crystal.

8. The apparatus as defined by claim 1 wherein said substrate comprises silicon, wherein a transparent silicon dioxide layer is disposed between said substrate and said waveguide, and wherein said detecting means comprises a pair of detectors positioned on that surface of the substrate adjacent said silicon dioxide layer.

9. An integrated optical write/read head comprising a planar optical waveguide for guiding light from a source along an optical axis, focusing means for coupling such beam out of said waveguide at an egress zone and for bringing such beam to focus at a plane spaced from said waveguide, and means for selectively varying the effective refractive index of said waveguide in the vicinity of said egress zone to vary the position at which the beam is brought to focus by said focusing means, characterized in that said refractive index-varying means comprises a pair of spaced planar electrodes having an electro-optic material disposed therebetween said electrodes and material being arranged atop said waveguide, in the vicinity of said egress zone, said electrodes being parallel with respect to each other and said waveguide, and means for applying a variable voltage between said electrodes to establish a variable electric field therebetween, the instantaneous displacement of the focused spot from a desired position in said plane being proportional to the applied voltage.

10. The apparatus as defined by claim 9 wherein said electro-optic layer comprises a liquid crystal.

* * * * *